United States Patent [19]
Smith et al.

[11] Patent Number: 5,923,293
[45] Date of Patent: Jul. 13, 1999

[54] METHOD AND APPARATUS FOR ACCOMPLISHING EXTENDED RANGE TCAS USING A DUAL BANDWIDTH RECEIVER

[75] Inventors: Mark D. Smith, Glendale; Lyle Alan Fajen, Scottsdale, both of Ariz.

[73] Assignee: Honeywell Inc., Minneapolis, Minn.

[21] Appl. No.: 08/940,420

[22] Filed: Sep. 30, 1997

[51] Int. Cl.$^6$ ........................................ G01S 3/02
[52] U.S. Cl. .......................... 342/455; 342/29; 342/30; 701/301
[58] Field of Search ................... 342/29, 30, 455; 701/301

[56] References Cited

U.S. PATENT DOCUMENTS

| | | |
|---|---|---|
| 4,027,307 | 5/1977 | Litchford . |
| 4,128,839 | 12/1978 | McComas . |
| 4,298,875 | 11/1981 | Sullivan . |
| 4,317,119 | 2/1982 | Alvarez . |
| 4,403,220 | 9/1983 | Donovan . |
| 4,855,748 | 8/1989 | Brandao et al. . |
| 4,975,708 | 12/1990 | Stayton . |
| 5,029,092 | 7/1991 | Funatsu . |
| 5,191,349 | 3/1993 | Dinsmore et al. . |
| 5,202,684 | 4/1993 | Funatsu ......................... 340/961 |
| 5,805,111 | 9/1998 | Brettner, III et al. .............. 342/455 |

OTHER PUBLICATIONS

PCT International application, International Publication No. WO 90/01202 to John Harold Dunlavy, published Feb. 8, 1990, entitled "Improvements to Aircraft Collision Avoidance".

"Introduction to TCAS II", U.S. Department of Transportation, Federal Aviation Administration, Mar. 1990.

"TCAS II Study Guide", Honeywell Inc, Jan. 1993, Pub. No. 03–3841–09–04, pp. 2–1 thru 2–5.

*Primary Examiner*—Mark Hellner
*Attorney, Agent, or Firm*—Snell & Wilmer L.L.P.

[57] ABSTRACT

A Traffic Alert and Collision Avoidance System (TCAS) uses a dual bandwidth receiver to achieve extended range operation. During normal operations TCAS radio signals are filtered by a bandpass filter which passes all TCAS radio signals of interest. When extended range operation is desired the TCAS radio signals are filtered by a more narrow bandpass filter. The narrower filter passes only selected TCAS radio signals and improves the signal to noise ratio and thus allows detection of selected TCAS radio signals at extended range. The TCAS system switches between the normal mode and the extended range mode to detect and track aircraft at both near and far distances.

10 Claims, 4 Drawing Sheets

METHOD AND APPARATUS FOR ACCOMPLISHING EXTENDED RANGE TCAS USING A DUAL BANDWIDTH RECEIVER

BACKGROUND OF INVENTION

The present invention relates generally to avionics for aircraft and more specifically to airborne collision avoidance systems and transponders.

The development of an effective airborne collision avoidance system (CAS) has been the goal of the aviation community for many years. Airborne collision avoidance systems provide protection from collisions with other aircraft and are independent of ground based air traffic control.

Spurred by the collision of two airliners over the Grand Canyon in 1956, the airlines initiated a study of collision avoidance concepts. A chronology of the development of airborne collision avoidance systems can be found in "INTRODUCTION TO TCAS II", printed by the Federal Aviation Administration (FAA) of the U.S. Department of Transportation, March 1990, which is incorporated herein by reference.

By the late 1980's a system for airborne collision avoidance was developed with the cooperation of the airlines, the aviation industry, and the FAA. The system, called Traffic Alert and Collision Avoidance System II (TCAS II) was mandated by Congress to be installed on most commercial aircraft flying in U.S. airspace by the early 1990's.

A TCAS II equipped aircraft monitors other aircraft within approximately a 20 mile radius of the TCAS II equipped aircraft. When an intruding aircraft is determined to be a threat the TCAS II system alerts the pilot to the danger and gives the pilot bearing and distance to the intruding aircraft. If the threat is not resolved and a collision or near miss is probable the TCAS II system advises the pilot to take evasive action by either climbing or descending to avoid a collision.

Although current collision avoidance systems (CAS) such as TCAS work well, improved performance and functionality have been proposed. Specifically, the FAA would like to extend the range of CAS systems from 20 miles to 40 miles or more. It has been proposed that an extended range CAS would make flying safer and provide other benefits such as enabling aircraft to perform self-initiated air traffic control (ATC) functions over the ocean. This would allow faster aircraft to pass slower aircraft on their own during long oceanic flights, a maneuver not currently permitted. This would save both time and fuel for aircraft.

The problem is that an extended range CAS system must be compatible with currently operating CAS systems which do not have extended range capability. This implies that extended range systems must substantially increase their range of transmission and reception to be capable of communicating with a non-extended range equipped CAS aircraft. The only obvious solutions are expensive hardware upgrades to dramatically improve both the transmitter and/or receiver performance of the system. These solutions require expensive redesigns of the entire system.

Significant cost savings would be achieved by a collision avoidance system which achieves extended range without the need for expensive hardware designs. It would be especially useful if the range of CAS systems could be improved while maintaining compatibility with current systems.

Clearly there exists the need for an airborne collision avoidance system which achieves extended range, makes flying safer, saves time and fuel, is backward compatible, and achieves these goals with minimum expense.

SUMMARY OF THE INVENTION

The invention discloses a Traffic Alert and Collision Avoidance System (TCAS) which uses a dual bandwidth receiver to achieve extended range operation. During normal operations TCAS radio signals are filtered by a bandpass filter which passes all TCAS radio signals of interest. When extended range operation is desired the TCAS radio signals are filtered by a more narrow bandpass filter. The narrower filter passes only selected TCAS radio signals and improves the signal to noise ratio thus allowing detection of selected TCAS radio signals at extended range. The TCAS system switches the narrow bandpass filter into and out of the receive path to detect and track aircraft at both near and far distances.

The key to the invention is the dual bandwidth receiver which includes a narrow bandwidth filter which is selectively enabled to filter TCAS radio signals. This design allows a TCAS system to achieve extended range operation while maintaining compatibility with current systems.

A brief review of TCAS operations is useful to understand the invention.

TCAS systems operate in conjunction with Mode A, C, and S transponders. Typical TCAS systems include Mode S transponder functionality for proper operation. When a transponder on an aircraft receives an interrogation signal, the transponder transmits a "reply". The TCAS on the interrogating aircraft receives the reply and is able to determine both the relative distance and bearing of the replying aircraft. In addition to distance and bearing, Mode C transponders also provide altitude data in the reply message. Mode S transponders provide both altitude data and an identifying address in the reply message. Interrogation signals are transmitted at 1030 Mhz and reply signals are transmitted at 1090 Mhz.

Mode S transponders are the latest type of transponder and are backwards compatible with Mode A and C transponders. However, they differ in two ways which are significant to the invention. First, Mode S transponders transmit a spontaneous transmission (squitters) (i.e. unsolicited reply) once a second even when no interrogation signal is received. Second, Mode S transponder replies are transmitted on a more narrow bandwidth. Mode S replies are transmitted at 1090+/−1 Mhz while Mode A and C replies are transmitted at 1090+/−3 Mhz. Most aircraft are equipped with Mode S transponders and airline aircraft with 10 or more seats are required to have TCAS I capability which includes Mode S transponder functionality.

The invention takes advantage of these differences in the Mode S operation to achieve extended range operation while maintaining full backward compatibility. How this is achieved is explained below.

The invention uses a narrow (4 Mhz) bandwidth filter which can be switched into and out of the receive path. This narrow bandwidth filter is designed to pass Mode S reply signals which are transmitted at 1090+/−1 Mhz. In contrast, typical or normal bandwidth filters used in TCAS systems pass an 8 Mhz band which is suitable for passing replies transmitted at 1090+/−3 MHz (i.e. Mode A, C, and S replies).

The narrow bandwidth filter reduces the bandwidth by one half and consequently reduces the background noise by a similar one half. The signal to noise ratio (S/N) is increased proportionally thus allowing detection of weaker/distant Mode S replies. The S/N improvement provided by the invention translates into a 41% increase in range.

Although an intruding Mode S equipped aircraft is too far away to receive an interrogation, the invention allows tracking of the aircraft since Mode S transponders transmit an unsolicited reply (squitter) once per second at all times. If the intruding aircraft approaches within range of normal TCAS operation, it is handled in the conventional manner.

One embodiment uses a switch on the TCAS control panel to allow a pilot to manually switch between normal mode and extended range mode. When normal mode is selected, the TCAS functions a conventional TCAS and does not track aircraft at extended range. When the extended range mode is selected the invention is enabled such that the narrow bandwidth filter is continually switched into and out of the receive path and aircraft both near and far are tracked.

The preferred embodiment however, automatically switches between the two modes. In the preferred embodiment, the TCAS computer continually switches between the two modes such that both normal mode and extended range mode functions are available. In typical operation the TCAS operates in normal mode 30% of the time and operates in extended mode 70% of the time. In high traffic density areas, the TCAS computer automatically reduces the extended range operation as needed since the TCAS can track only a limited number of aircraft at a time. This is not a problem since very distance aircraft are not an immediate concern in such high density situations.

The invention is particularly useful in low density airspace such as flights over the oceans. In these conditions traffic density is low and most aircraft are Mode S equipped.

Extended range TCAS is important to many future improvements in air traffic control (ATC). It may allow closer separation of aircraft on a fixed flight path since the TCAS could be used as an "ATC in the sky" and reduce reliance on ground ATC. It can aid faster aircraft in passing slower aircraft, thus saving time and fuel, and will aid in implementation of free flight, a concept which was accepted by the Federal Aviation Administration (FAA) on Mar. 15, 1996. The purpose of free flight is to give pilots the ability to control more of the flight parameters for added efficiency.

Therefore, the object of the invention is to extend the range of TCAS systems.

A feature of the invention is a dual bandwidth receiver which is selectable.

Another feature is a computer which automatically switches a narrow bandwidth filter into and out of the receive path.

Yet another feature is the narrow bandwidth filter switched into and out of the receive path as a function of air traffic density.

An advantage of the invention is improved air safety.

Another advantage is extended TCAS range.

Another advantage is backward compatibility with TCAS systems.

Yet another advantage is low cost.

The significant features of the invention are illustrated in the figures and described more fully below.

DETAILED DESCRIPTION

Figure 1:
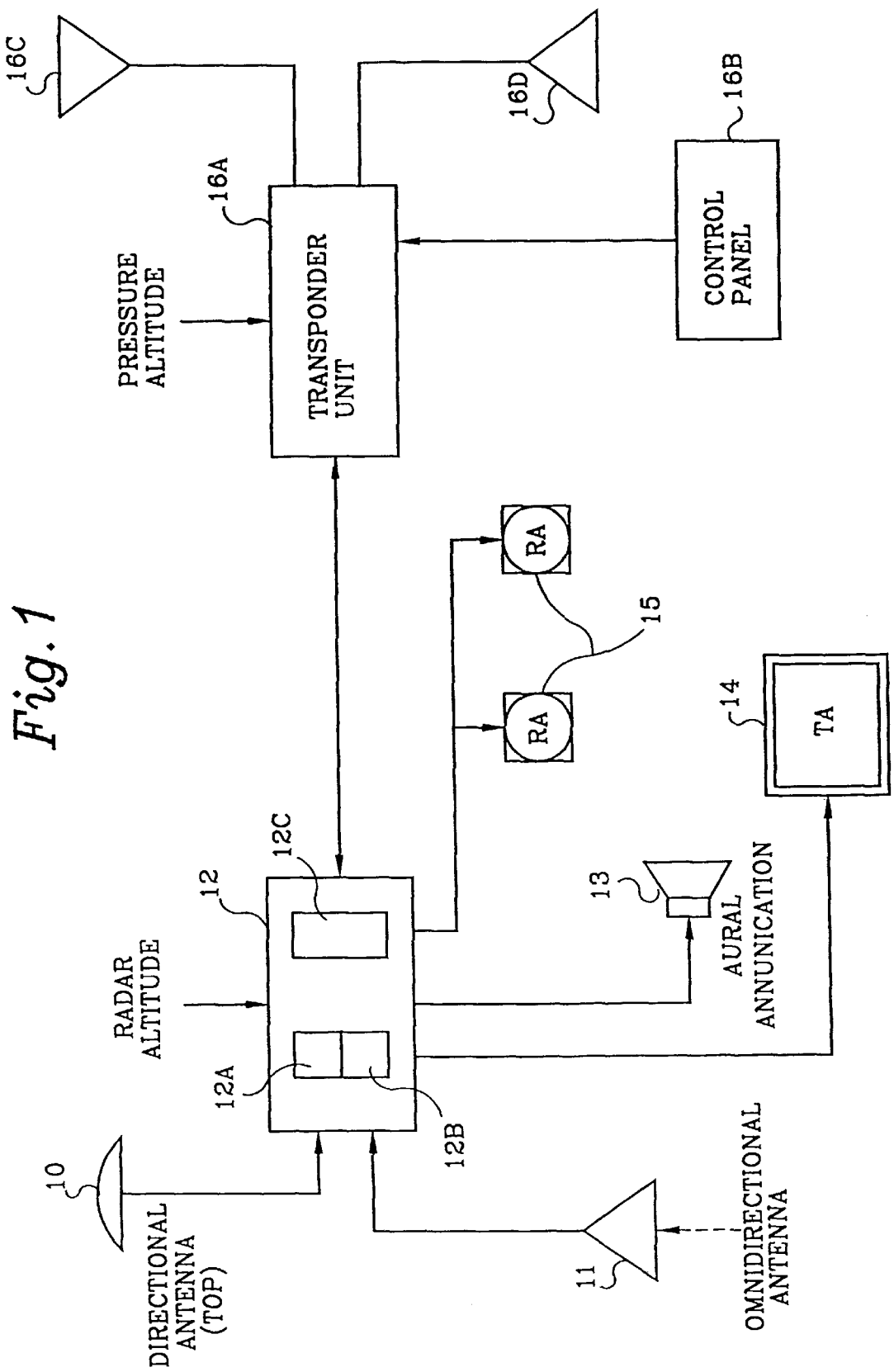
FIG. 1 illustrates a diagram of a TCAS system.

FIG. 1 is a block diagram of a TCAS system. Shown in FIG. 1 are TCAS directional antenna 10, TCAS omnidirectional antenna 11, and TCAS computer unit 12 which includes receiver 12A, transmitter 12B, and processor 12C. Also shown are aural annunciator 13, traffic advisory (TA) display 14, and resolution advisory displays 15. Transponder 16 is comprised of transponder unit 16A, control panel 16B, and transponder antennas 16C and 16D. The TCAS and transponder operate together to function as a collision avoidance system. Those skilled in the art understand that this is merely illustrative of a typical TCAS. Many other configurations are possible such as replacing omnidirectional antenna 11 with a directional antenna.

The operation of TCAS and each component are well known in the art and need not be described in detail. An excellent discussion of TCAS can be found in "INTRODUCTION TO TCAS II" referenced above.

The present invention is primarily related to modifying receiver 12A and processor 12C to achieve extended useful range.

Figure 2:
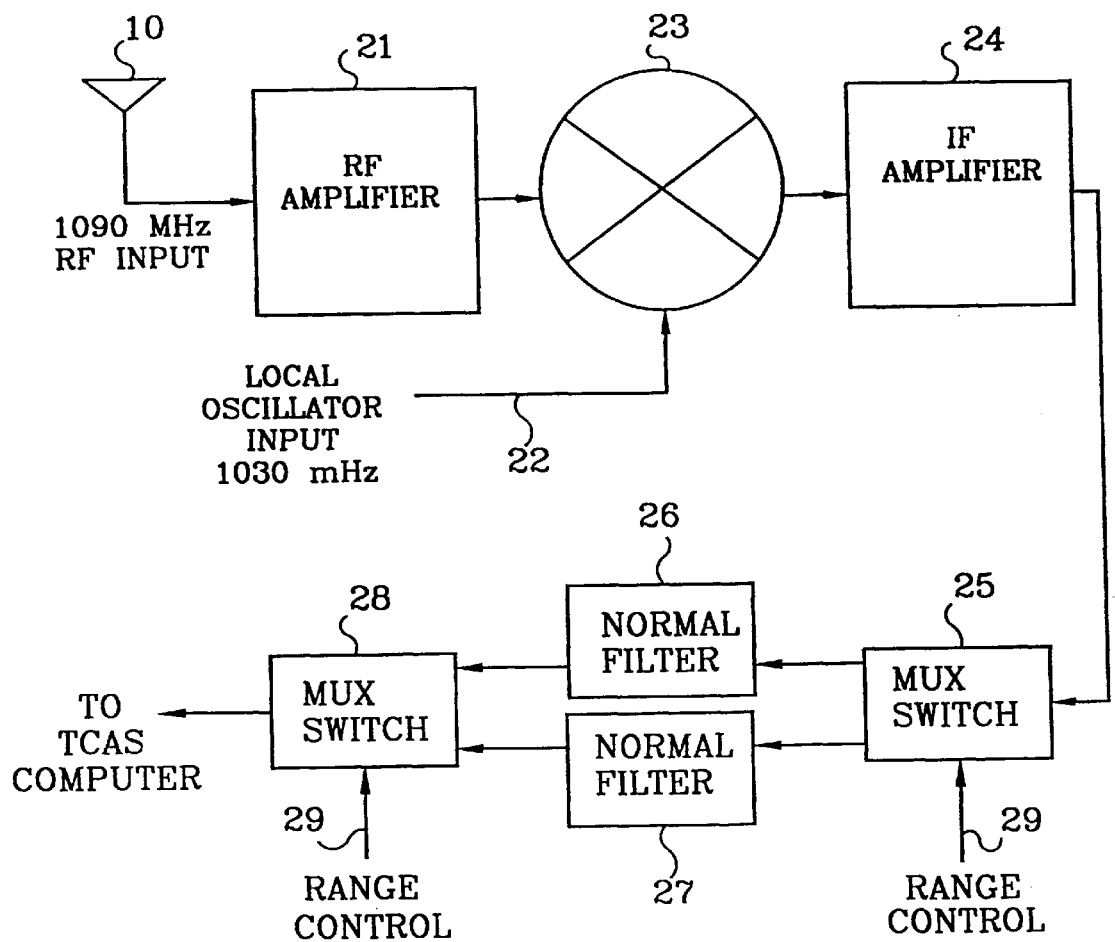
FIG. 2 is a block diagram of the invention.

FIG. 2 is a block diagram of the invention. TCAS radio frequency signals are received at antenna 10. TCAS radio frequency signals (e.g. Mode S squitters and replies) are pulsed radio signals transmitted at 1090+/−3 Mhz.

Radio signals are input to RF amplifier 21. RF amplifier 21 is a conventional low noise amplifier (LNA). RF amplifier 21 establishes the receiver primary noise factor (NF) performance.

RF amplifier 21 drives conventional passive mixer 23. Mixer 23 produces a 60 Mhz intermediate frequency (IF) by mixing the 1090 Mhz input signal with 1030 Mhz local oscillator input 22.

Primary IF amplifier 24 provides gain at 60 Mhz to the output of mixer 23 and maintains the NF established by RF amplifier 21.

First MUX switch 25 switches the IF signal from IF amplifier 24 to either normal filter 26 or narrow filter 27 as directed by range control signal 29. Range control 29 directs the IF signal to normal filter 26 for normal range operation and directs the IF signal to narrow filter 27 for extended range operation.

Normal filter 26 and narrow filter 27 are conventional bandpass filters having bandwidths of approximately 8 Mhz and 4 Mhz respectively.

Second MUX switch 28 switches the appropriate IF signal from filters 26 and 27 as directed by range control signal 29. Range control signal 29 preferably is generated by processor 12C but may also be controlled by the pilot.

The IF signal output from second MUX 28 is processed in a conventional manner and communicated to processor 12C for analysis as needed.

Figure 3:
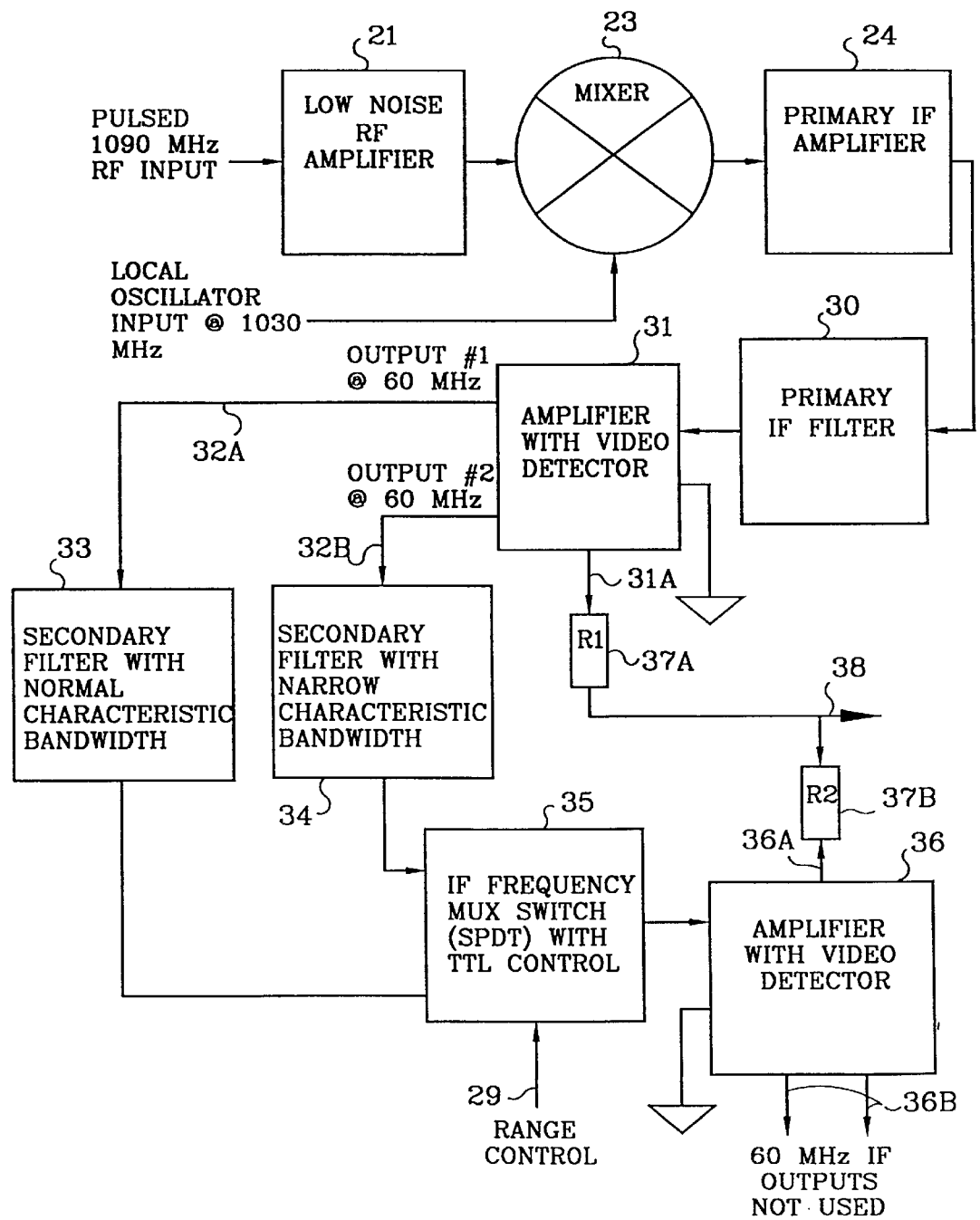
FIG. 3 illustrates the preferred embodiment of the invention.

FIG. 3 shows the preferred embodiment of the invention. RF amplifier 21, mixer 23, and IF amplifier 24 function identically as in FIG. 2.

Primary IF filter 30 is a fixed tuned 60 Mhz filter which limits the noise bandwidth applied to secondary IF amplifier 31. Primary IF filter 30 has a bandwidth of 10 Mhz. Secondary IF amplifier 31 is a log/IF amplifier/detector which outputs a first logarithmic video current pulse 31A and two amplified linear 60 Mhz IF signals 32.

One amplified linear IF signal 32A is filtered by normal bandwidth filter 33 and the other amplified linear IF signal 32B is filtered by narrow bandwidth filter 34. Normal bandwidth filter 33 has a bandwidth of 8 Mhz and narrow bandwidth filter 34 has a bandwidth of 4 Mhz.

The outputs of filters 33 and 34 are applied to MUX 35 which switches either the output of normal filter 33 or narrow filter 34 to third IF amplifier 36. MUX 35 is a single pole/double throw (SPDT) intermediate frequency MUX and is controlled by range control signal 29. Switching time is within ten nanoseconds.

Third IF amplifier 36 outputs a second logarithmic video current pulse 36A and two amplified linear 60 Mhz IF outputs 36B. The IF outputs 36B are not used in the invention. Both secondary IF amplifier 31 and third IF amplifier 36 are identical and have differential input connections but are not used in that configuration.

Current pulses 31A and 36A are summed through resistors 37A and 37B to provide more than 60 dB of usable dynamic range. Summed video pulse 38 is communicated to TCAS processor 12C for analysis and actions as required.

In the preferred embodiment, bearing of an intruder at extended range is provided by the directional antenna. However, the only range information provided is the knowledge that the intruder is greater than a certain distance away. In an alternate embodiment, Mode S squitters include GPS coordinates. In this embodiment, bearing and range of an intruder are determined by comparing intruder GPS coordinates with the TCAS equipped aircraft GPS coordinates.

Figure 4:
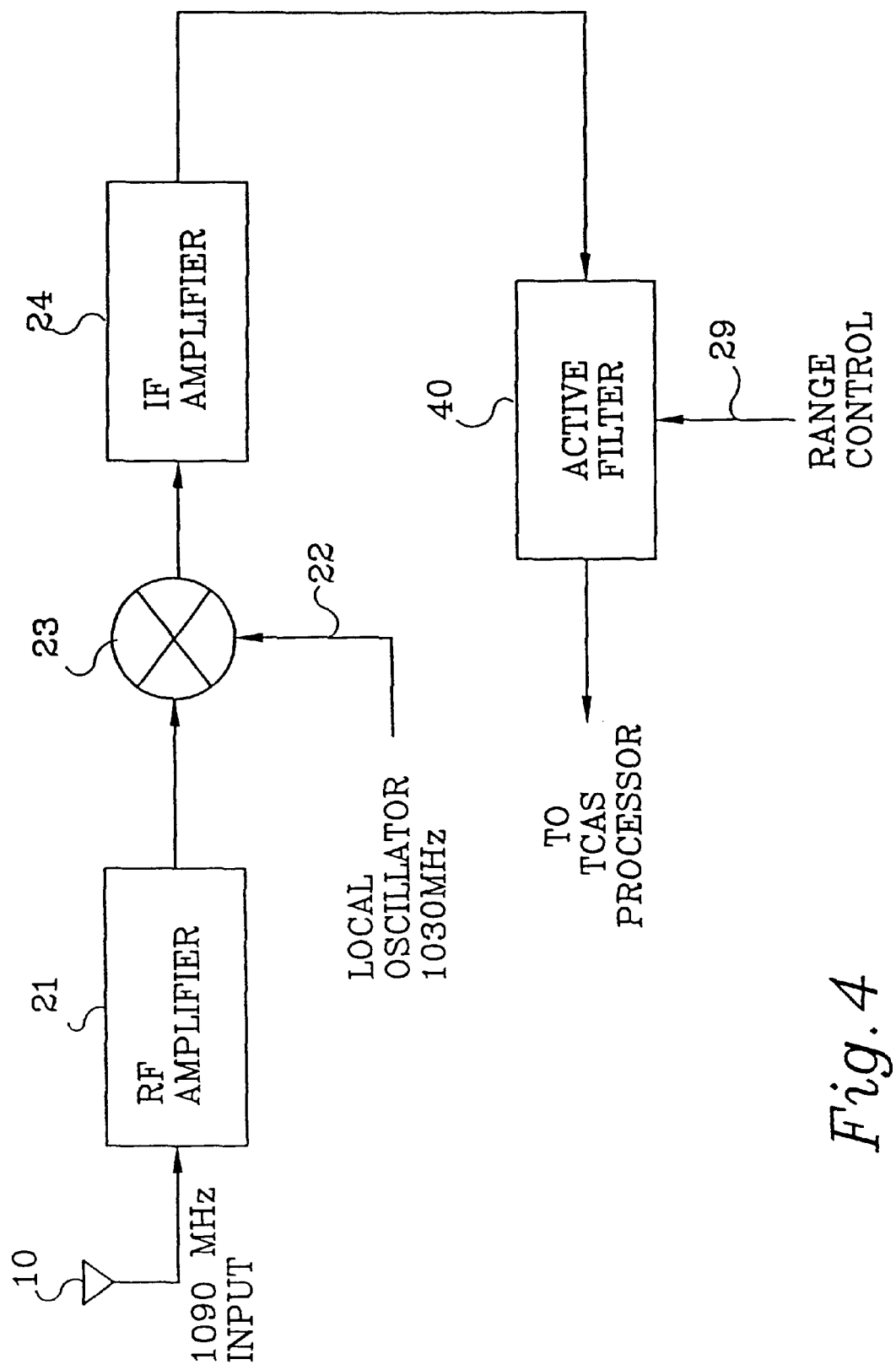
FIG. 4 illustrates an alternate embodiment of the invention.

FIG. 4 shows an alternate embodiment of the invention which uses an active filter to replace several components of FIG. 3. In this embodiment antenna 10, RF amplifier 21, local oscillator 22, mixer 23, and IF amplifier 24 are identical to the preferred embodiment in FIG. 3. However, the dual filters and MUX's of FIG. 3 are replaced by an active filter 40. Active filter 40 is controlled by range control 29 to switch between wide bandwidth and narrow bandwidth functionality. A drawback of using an active filter is the increased cost.

Receiver range sensitivity is a function of signal to noise ratio (S/N). When S equals N, tangential receiver sensitivity is established. It is described by the equation:

$$S=N=E^2=4RkTB$$

where:

S=Received signal level
N=Detected noise power
E=Root mean square noise voltage
R=Resistive component (usually 50 ohms)
k=Boltzmann's Const.=$1.380622\ e^{-23}$ (Joules/Kelvin)
T=Temperature (absolute degrees Kelvin)
B=Bandwidth (Hertz)

With the establishment that all factors remain constant except B, noise N (i.e. $E^2$) is reduced in proportion to bandwidth while S remains constant. Therefore, when filter bandwidth is halved, noise power is reduced by the power ratio or decibel reduction of:

$$\text{Power ratio (dB)}=10\ \log_{10}(0.5)=-3\ \text{dB}$$

Because signal (S) remains constant and noise (N) is reduced, a 3 dB improvement in S/N at near tangential sensitivity is established. This translates into a linear range improvement factor of 1.41 since the range increases proportionally to the square root of the power or S/N improvement.

The method of the invention follows from the apparatus. A TCAS having a dual bandwidth receiver as described above is provided. TCAS radio signals are filtered, for a first time period, through the normal bandwidth filter and not through the narrow bandwidth filter so that all transponder spontaneous transmissions and replies are received and processed by the TCAS system. TCAS radio signals are filtered, for a second time period, through the narrow bandwidth filter such that the signal to noise ratio is improved for desired transponder spontaneous transmissions and the effective range of said TCAS system is increased. The narrow bandwidth filter is selectively switched into and out of the receive path in accordance with a predetermined algorithm such that as air traffic density increases the second time period is reduced.

This description has been for descriptive purposes only and is not intended to limit the scope of the invention. Those skilled in the art recognize numerous alternate embodiments of the invention which deviate from the described embodiment but still perform the same work in substantially the same way to achieve substantially the same result and are therefore equivalent to the invention.

It is clear from the foregoing that the present invention represents a new and useful method and apparatus for extending the range of TCAS.

The embodiments of an invention in which an exclusive property or right is claimed are defined as follows:

1. An extended range Traffic Alert and Collision Avoidance System (TCAS) comprising:
  a) a dual bandwidth receiver suitable for processing transponder spontaneous transmissions and replies, said receiver including,
    1) a normal bandwidth filter capable of passing frequencies containing transponder spontaneous transmission and reply signals and attenuating other frequencies, and,
    2) a narrow bandwidth filter capable of passing a more narrow band of frequencies than said normal bandwidth filter such that desired transponder spontaneous transmissions and reply signals are passed and other frequencies are attenuated;
  b) said filters selectable such that said spontaneous transmissions and replies are filtered by said normal bandwidth filter and not filtered by said narrow bandwidth filter in normal TCAS operation and said spontaneous transmissions and replies are filtered by said narrow bandwidth filter in extended range TCAS operation.

2. The extended range Traffic Alert and Collision Avoidance System (TCAS) according to claim 1 wherein said narrow bandwidth filter is continuously switched into and out of the receive path to achieve both normal and extended range functionality are available simultaneously to an operator.

3. The extended range Traffic Alert and Collision Avoidance System (TCAS) according to claim 1 wherein said filters are selected in accordance with a predetermined algorithm such that as air traffic density increases said TCAS system spends more time filtering said transmissions and replies through said normal bandwidth filter only and spends less time filtering said transmissions and replies through said narrow bandwidth filter.

4. A Traffic Alert and Collision Avoidance System (TCAS) comprising:
  a) a dual bandwidth receiver for processing TCAS radio signals, said receiver including,
    1) a narrow bandwidth filter;
  b) said filter being selectable such that when extended range operation is desired said TCAS radio signals are filtered by said narrow bandwidth filter whereby the signal to noise ratio is improved and extended range operation is achieved.

5. The Traffic Alert and Collision Avoidance System (TCAS) according to claim 4 wherein said narrow bandwidth filter is selected in accordance with a predetermined algorithm such that as air traffic density increases said TCAS system spends less time filtering TCAS radio signals through said narrow bandwidth filter.

6. A Collision Avoidance apparatus comprising:
   a) receiver means for detecting data in TCAS radio signals, said receiver means including,
      1) dual filter means for processing radio frequency signals in at least two modes, said filter means passing substantially all transponder spontaneous transmission and reply frequencies and attenuating other frequencies when in a first mode and said filter means passing a more narrow band of frequencies when in a second mode thereby increasing the signal to noise ratio for selected TCAS radio signals.

7. The Collision Avoidance Apparatus according to claim 6 wherein said filter means is continuously switched between said first mode and said second mode according to a predetermined algorithm such that both normal TCAS tracking and extended range tracking are achieved simultaneously.

8. A method of accomplishing extended range TCAS, said method comprising the steps of:
   a) providing a TCAS system having a dual bandwidth receiver for processing TCAS radio signals, said receiver including,
      1) a normal bandwidth filter capable of passing frequencies containing transponder spontaneous transmission and reply signals and attenuating other frequencies, and,
      2) a narrow bandwidth filter capable of passing a more narrow band of frequencies than said normal bandwidth filter, said narrow bandwidth filter being selectable such that said TCAS radio signals are filtered by said narrow bandwidth filter when desired;
   b) filtering, for a first time period, said TCAS radio signals through said normal bandwidth filter and not through said narrow bandwidth filter so that all transponder spontaneous transmissions and replies are received and processed by said TCAS system; and,
   c) filtering, for a second time period, said TCAS radio signals through said narrow bandwidth filter such that the signal to noise ratio is improved for desired transponder spontaneous transmissions and the effective range of said TCAS system is increased.

9. The method according to claim 8 wherein said filters are selected in accordance with a predetermined algorithm such that as air traffic density increases said first time period increases.

10. The method according to claim 8 wherein said filters are selected in accordance with a predetermined algorithm such that as air traffic density increases said second time period decreases.

* * * * *